United States Patent [19]
Moghe et al.

[11] Patent Number: 5,127,783
[45] Date of Patent: Jul. 7, 1992

[54] CARBON/CARBON COMPOSITE FASTENERS

[75] Inventors: Sharad R. Moghe, Northfield Center; Mark J. Purdy, Akron, both of Ohio; Wei-Teh Shih, Yorba Linda; James A. Tallon, Buena Park, both of Calif.

[73] Assignee: The B.F. Goodrich Company, Akron, Ohio

[21] Appl. No.: 356,815

[22] Filed: May 25, 1989

[51] Int. Cl.⁵ .................. F16B 35/04; B65H 81/00
[52] U.S. Cl. .................... 411/411; 411/424; 411/901; 411/908; 156/172; 156/393; 470/10
[58] Field of Search ............ 411/411, 424, 901–903, 411/908, 392; 156/172, 392, 393; 10/27 R

[56] References Cited

U.S. PATENT DOCUMENTS

| | | | |
|---|---|---|---|
| Re. 28,574 | 10/1975 | Ruoff | 425/78 |
| 2,306,516 | 12/1942 | Zahn | 22/190 |
| 2,915,110 | 12/1959 | Ferguson et al. | 156/393 |
| 3,283,050 | 11/1966 | Boggs | 411/900 |
| 3,394,527 | 7/1968 | McLean | 405/260 |
| 3,495,494 | 2/1970 | Scott. | |
| 3,579,402 | 5/1971 | Goldsworthy et al. | 156/392 |
| 4,265,981 | 5/1981 | Campbell | 428/591 |
| 4,326,905 | 4/1982 | Tanaka | 156/393 |
| 4,389,269 | 1/1983 | Cooper | 156/172 |
| 4,478,544 | 10/1984 | Strand | 411/34 |
| 4,478,545 | 10/1984 | Mizusawa et al. | 411/437 |
| 4,522,529 | 6/1985 | Conley | 403/343 |
| 4,581,263 | 4/1986 | Lukas | 428/36 |
| 4,620,401 | 11/1986 | L'Esperance et al. | 52/309.15 |
| 4,623,290 | 11/1986 | Kikuzawa et al. | 411/908 |
| 4,659,268 | 4/1987 | DelMundo et al. | 411/901 |
| 4,687,394 | 8/1987 | Berecz | 411/908 |
| 4,687,395 | 8/1987 | Berecz | 411/901 |
| 4,687,396 | 8/1987 | Berecz | 411/908 |
| 4,687,397 | 8/1987 | Berecz | 411/901 |
| 4,687,398 | 8/1987 | Berecz | 411/908 |
| 4,717,302 | 1/1988 | Adams et al. | 411/903 |
| 4,863,330 | 9/1989 | Olez et al. | 411/908 |

OTHER PUBLICATIONS

Advertisement by Tiodize Co., p. 29, Advanced Composites Nov./Dec. 1988.
Tough Composites Advance Aerospace Race, Engineering News.

*Primary Examiner*—Neill R. Wilson
*Attorney, Agent, or Firm*—David M. Ronyak

[57] ABSTRACT

A carbon and/or ceramic fiber reinforced carbon and/or ceramic matrix composite threaded member including a core, a fiber containing thread-defining element bonded to the exterior of the core and a reinforcing fabric layer securing the thread-defining element to the core. The thread-defining element may be an integral part of a tubular braided reinforcing fabric or applied to the core prior to application of a reinforcing fabric layer. Externally and internally threaded members and methods for their manufacture are described.

37 Claims, 12 Drawing Sheets

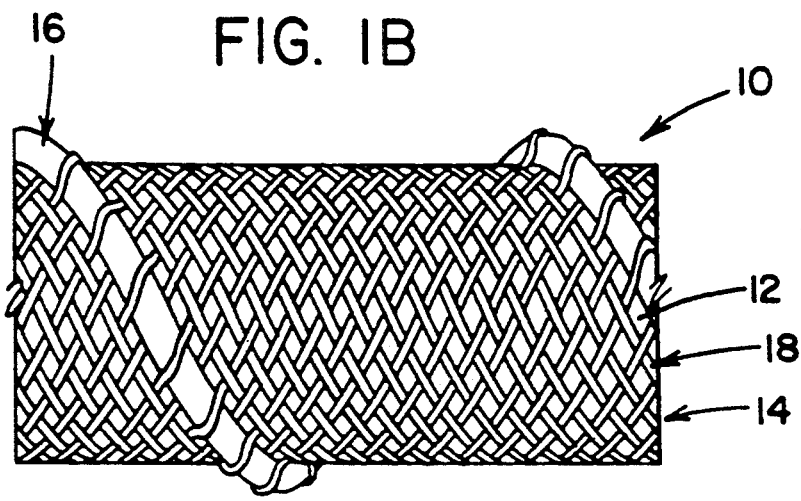
FIG. IB
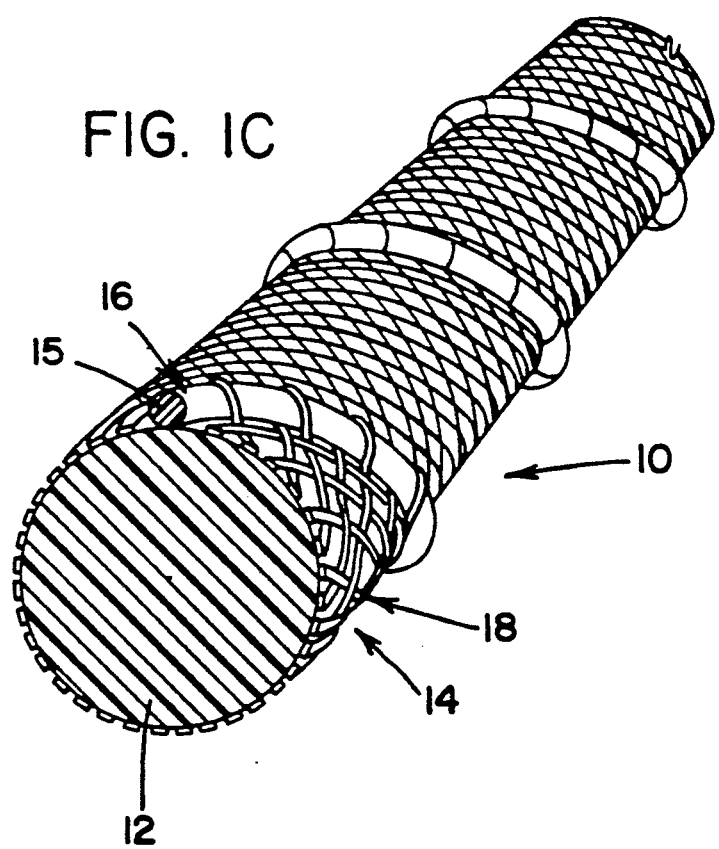
FIG. IC

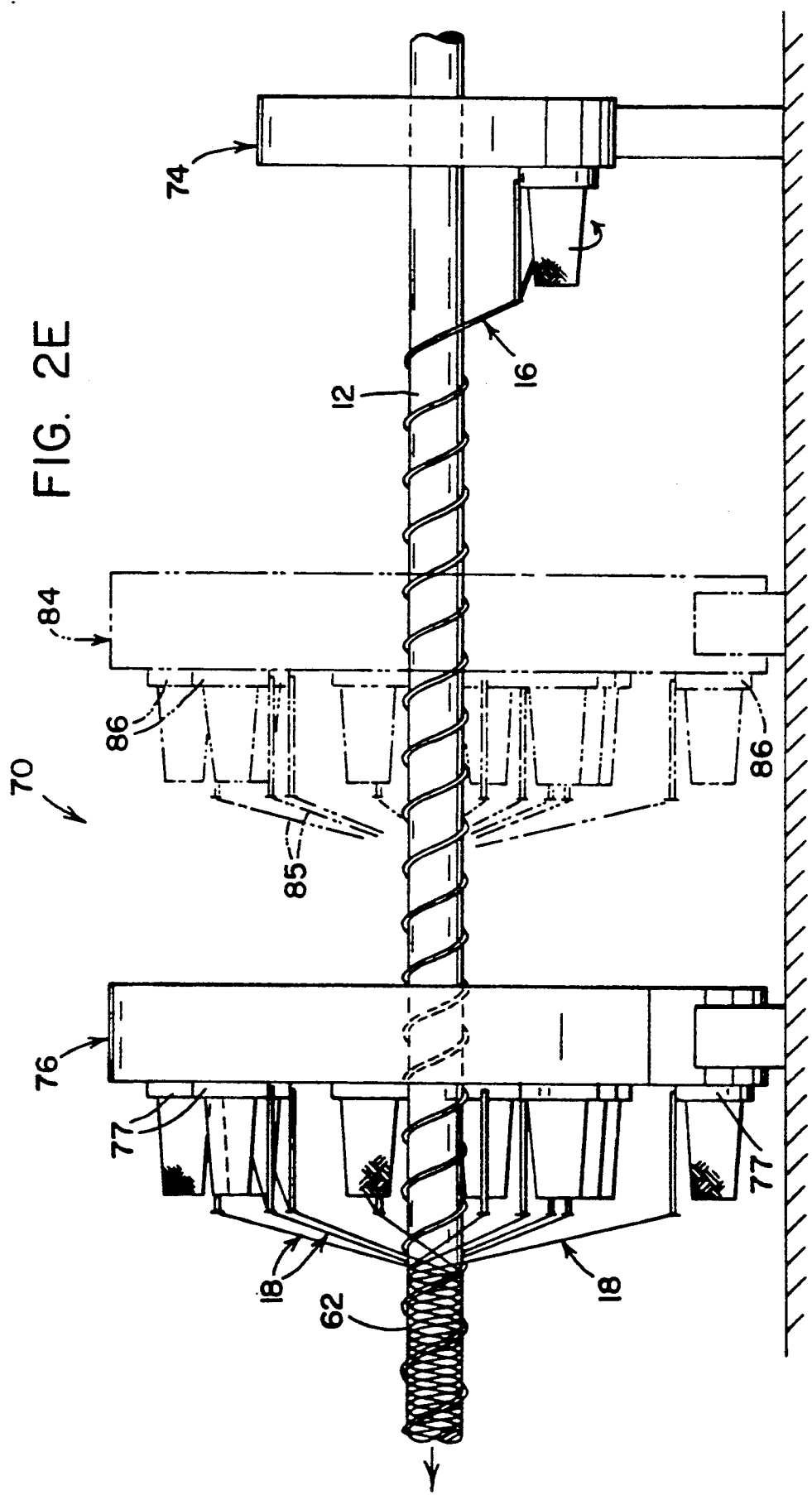

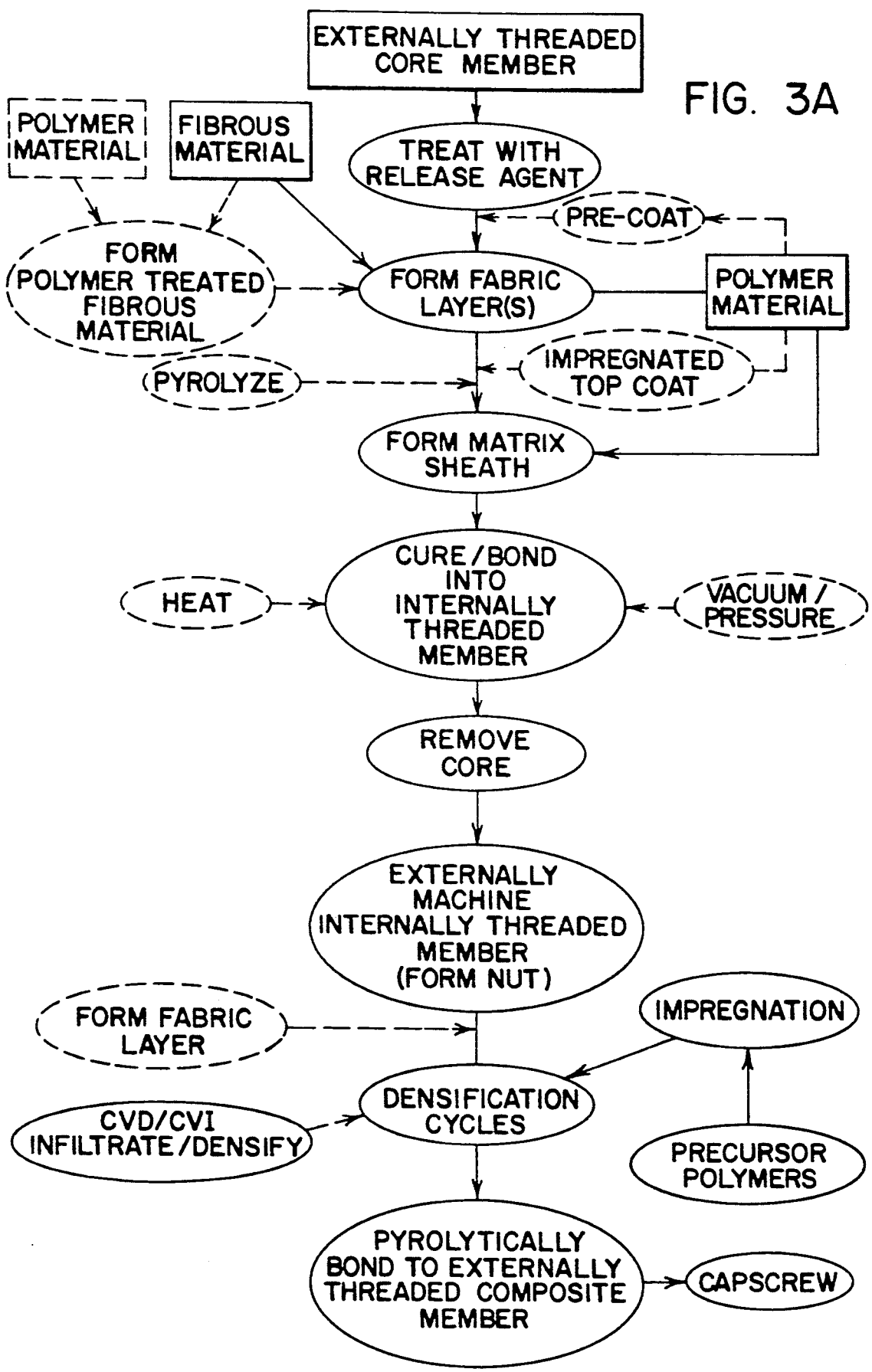

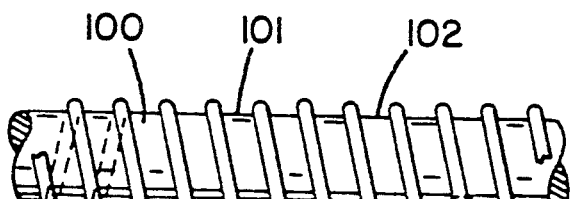
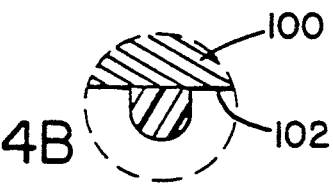
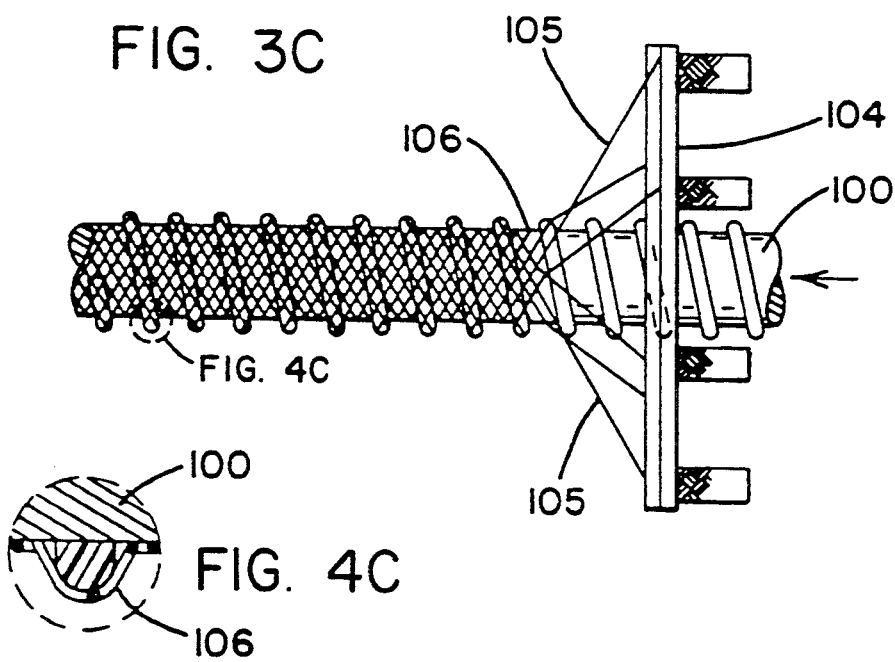
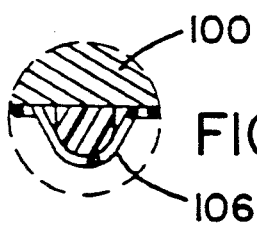
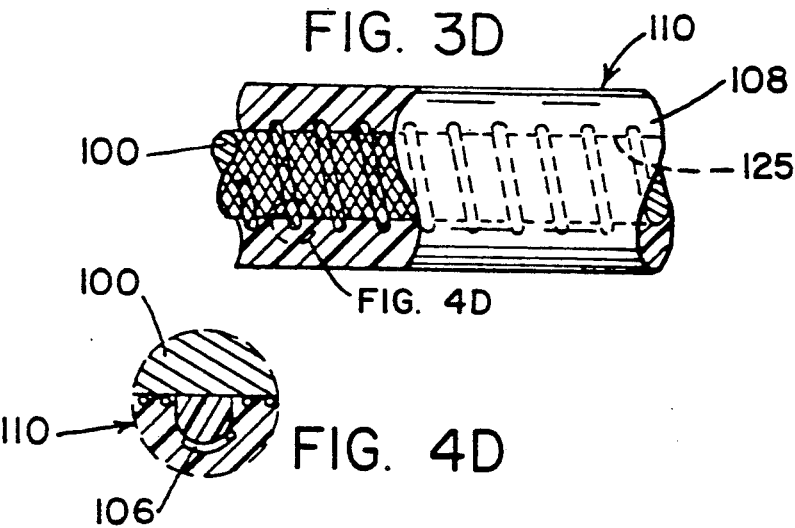

CARBON/CARBON COMPOSITE FASTENERS

This invention relates to carbon or ceramic fiber reinforced/carbon or ceramic matrix, threaded members suitable for use as fasteners, and more particularly, to carbon and/or ceramic fiber/carbon and/or ceramic matrix threaded composite members which are reinforced with fibers extending in multiple directions with at least some of the fibers extending in the direction of the thread and other fibers extending in a direction such that they cross the thread, and to a method of making same.

This application is related to application Ser. No. 07/283,480 filed Dec. 16, 1988 entitled "Braided Composite Threaded Member"; application Ser. No. 07/285,482 filed Dec. 16, 1988 entitled, "Fiber Reinforced Composite Threaded Member", application Ser. No. 07/285,483 filed Dec. 16, 1988 entitled, "Composite Bolt and Nut", now U.S. Pat. No. 5,032,925, application Ser. No. 07/529,831 filed May 29, 1990 entitled "Composite Bolt and Nut", application Ser. No. 07/529,831 being a divisional application from Ser. No. 07/284,483.

BACKGROUND OF THE INVENTION

Fiber reinforced polymeric resin composite materials are now widely used due to their outstanding strength-to-weight characteristics. Where it is desired to maximize these characteristics, carbon/carbon composite materials have been formed of carbon fibers such as those derived from PAN or pitch bonded by a matrix of pyrolytically formed carbon formed by pyrolysis of liquid resin impregnate or solid resin prepregnate or chemical vapor deposition or chemical vapor infiltration. While basic technology for the formation of such carbon/carbon composite materials has been around for a considerable period of time, it is currently being researched intensively as the need for the outstanding performance characteristics of such composite materials becomes more widely recognized.

Currently, structural components of such composite materials are joined one to another or to structural composites of, for example, an airframe, employing other materials such as conventional metallic fasteners or adhesives. Conventional mechanical fasteners of metal are unsatisfactory for several reasons. They are subject to a weight penalty and are susceptible to galvanic corrosion. Vibrations encountered during normal flight conditions and severe loading as experienced in storms or emergency maneuvers may result in failure of the fastener to the composite structure joint. Where such carbon/carbon composite materials are to be exposed to extremes of temperature, the difference in coefficient of thermal expansion between such conventional mechanical fasteners and that of the carbon/carbon composite material leads to undesired compromises or under utilization of the properties of the carbon/carbon composite material or premature failure of such joint or limits the service conditions to which the combination can be exposed. While adhesives have been employed to join such carbon/carbon composites, such adhesively bonded joints cannot readily be disassembled for service and maintenance.

While attempts have been made to solve the aforestated deficiencies, using composite plastic fasteners, these earlier efforts have not been widely adopted due to economic or technical shortcomings.

Exemplary of these earlier efforts are the following U.S. Patents:

| Patent No. | First Named Inventor |
| --- | --- |
| U.S. Pat. No. 3,495,494 | A. L. Scott |
| U.S. Pat. No. 4,478,544 | Strand |
| U.S. Pat. No. 2,306,516 | Zahn |
| U.S. Pat. No. 4,389,269 | Cooper |
| U.S. Pat. No. 4,265,981 | Campbell |

Scott discloses a threaded plastic member, having a glass fiber reinforced thread in which a plurality of resin impregnated glass fiber reinforcing filaments are disposed in serpentine manner throughout the cross section of the thread and extending longitudinally of the axis of the threaded member. The member is manufactured using a precision mold having a cavity complementary to that of the member to be formed.

Strand discloses a reinforced plastic rivet formed of carbon fibers encapsulated in an incompletely polymerized thermal resin matrix which in use is heated to soften the resin prior to upsetting of the rivet and full polymerization of the matrix. Strand's rivet is not threaded and has the disadvantage of needing to be stored prior to use in a controlled low temperature environment to prevent premature setting of the resin.

Zahn discloses use of a parting medium or membrane such as rubber over a threaded fastener which functions as a pattern to manufacture a hollow casting mold.

Cooper discloses a sport racket frame construction in which a resin impregnated tow is wound about part of a braided tow tube and thereafter a second braided tow tube is placed thereover to form an assembly that is internally pressurized and heat cured.

Campbell discloses impact resisting composites which may comprise multiple parallel filaments helically wrapped by a continuous multiple filaments or strips and embedded in a matrix material.

Carbon/carbon composite mechanical fasteners have been formed by machining them from larger blocks of carbon/carbon material.

While an exhaustive search has not been conducted, it is evident from the foregoing that a need remains for a threaded composite fastener suitable for use with carbon/carbon composite panel materials or structural members. A composite fastener which may be made economically in the absence of expensive molds is highly desired. A fastener which exhibits physical characteristics similar to modern composite materials such as those employed in aerospace applications and in harsh chemical environments is needed.

SUMMARY OF THE INVENTION

According to an aspect of the present invention, there is provided an externally threaded carbon or ceramic composite member comprising an elongate core, a carbon or ceramic fiber containing thread-defining element bonded by carbonaceous or ceramic material to the exterior surface of the core, said thread-defining element helically extending around and along the lengthwise direction of the core and projecting radially outwardly of the core, and a reinforcing fabric layer securing said thread-defining element to the core. The core may be solid or hollow, fiber reinforced or not. The helical thread-defining element preferably contains continuous carbon fiber reinforcement which may be defined by a bundle of fibers or a braided or twisted member of such fibers together with a carbon matrix. The thread-defining element may be a member of an integral tubular braided layer of carbonaceous filaments which are bonded by a carbon matrix to the exterior surface of the core. The helical thread-defining element may be preformed onto the core and thereafter a reinforcing fabric layer formed in situ thereover which envelopes, conforms to and secures the helical thread-defining element to the outer surface of the combined core and thread-defining element. Any of the core, the thread-defining element(s) and the reinforcing fabric layer(s) of the fastener may contain continuous or staple fibers or a blend of both.

According to a further aspect of the present invention, there is provided a method for making an externally threaded composite threaded member comprising a) providing an elongated core formed of material selected from the group consisting of carbon, ceramic, precursor of carbon and precursor of ceramic;

b) applying a helical thread-defining element to said core, said thread-defining element being formed of material selected from the group consisting of carbon, ceramic, precursor of carbon and precursor of ceramic;

(c) forming a reinforcing fabric layer on said core which secures said thread-defining element to said core, said reinforcing fabric layer being formed of material selected from the group consisting of carbon, ceramic, precursor of carbon and precursor of ceramic;

d) pyrolyzing the combined core, thread-defining element and fabric layer to form an externally threaded fiber reinforced non-metallic composite member.

According to a further aspect of the present invention, there is provided a hollow internally threaded carbon or ceramic composite member formed of carbon or ceramic fibers in a carbon or ceramic matrix, said member having an interior surface having an integral thread, said thread including a reinforcing fabric layer extending in the axial direction of the member and conforming to the threads. The reinforcing fabric preferably has continuous undulate members which closely conform to the contour of the thread.

According to a further aspect of the present invention, there is provided a method for making a hollow carbon or ceramic composite internally threaded member comprising: providing an elongate externally threaded cylindrical core, which is treated with a release agent;

forming on the core a reinforcing fabric layer enveloping the core and conforming to the threads of the core, said reinforcing fabric layer being formed of a material selected from the group consisting of carbon fiber, ceramic fiber, carbon fiber precursor, ceramic fiber precursor.

According to a further aspect of the present invention, there is provided in combination a carbon or ceramic composite hollow internally threaded member threadedly joined to an externally threaded carbon or ceramic member of complementary thread pitch and thread diameter.

According to a further aspect of the present invention, there is provided a hollow internally threaded carbon or ceramic fiber reinforced carbon or ceramic matrix member threadedly joined and bonded by carbon or ceramic matrix to an externally threaded member of complementary thread pitch and thread diameter.

In certain preferred embodiments, the core is itself formed of carbon fiber reinforced carbon matrix.

The above and other features and advantages of the invention will become more apparent from the following detailed description and appendant claims taken in conjunction with the accompanying drawings in which like reference numbers are used to refer to like parts, which together form a part of the specification.

BRIEF DESCRIPTION OF THE DRAWINGS

FIG. 1B is a sideview and 1C is a perspective view with parts broken away of a threaded composite member made in accordance with the present invention.

FIG. 2E is a side view partial schematic of the manufacture of an externally threaded member such as that depicted in FIGS. 2C and 2D of the present invention.

FIG. 3A is a flowchart depicting schematically in solid lines a preferred process and in dashed lines process variations and alternatives for the manufacture of certain embodiments of internally threaded members and externally threaded members to the present invention.

FIG. 3B is a side elevational schematic view of an externally threaded cylindrical core for use in manufacturing an internally threaded member according to the invention.

FIG. 3C is a side elevational schematic view depicting formation of a reinforcing fabric layer of an internally threaded member according to the invention.

FIG. 3D is a side elevational view of a completed internally threaded member according to the present invention with the externally threaded core still in place.

FIG. 4B is an enlarged sectional view of the encircled region of FIG. 3B.

FIG. 4C is an enlarged sectional view of the encircled region of FIG. 3C.

FIG. 4D is an enlarged sectional view of the encircled region of FIG. 3D.

DETAILED DESCRIPTION OF THE INVENTION

Figure 1A:
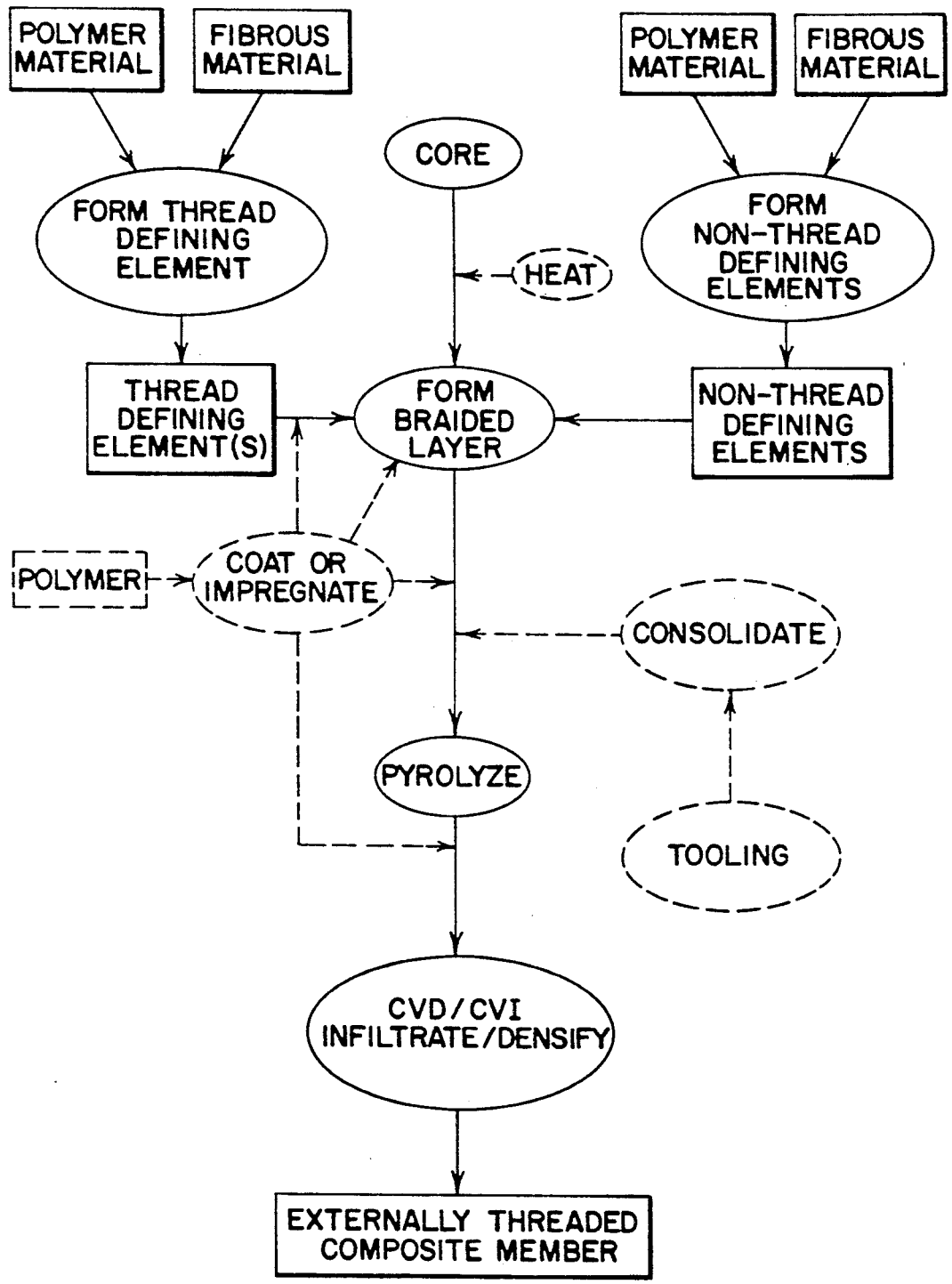
FIG. 1A is a flowchart depicting schematically in solid lines a preferred process and in dashed lines process variations and alternatives for the manufacture of certain embodiments of externally threaded composite members according to the present invention.

As used herein, the terms having, including, comprising and containing are synonymous. Unless otherwise specified at the point of use, all percentages, fractions and ratios in this specification, including the claims appended hereto, are on a volume basis. For simplicity of illustration, the following detailed description will focus on carbon/carbon composite fasteners. It is to be understood, however, that ceramic materials may be employed alone or in certain embodiments in combination with carbon fibers and carbon matrix to manufacture composite fasteners according to the invention.

Definition of Terms

A. The term "rod" as used herein means a slender bar and may be hollow or solid.

B. The term "pitch" and related forms as used herein means the distance from any point on the helical thread of a threaded member to the corresponding point on the adjacent thread formed by that same helical member measured parallel to the longitudinal axis of the threaded member.

C The term "helix angle" as used herein means the acute angle formed by the path of a thread-defining helical element and the lengthwise direction of the threaded member. A greater helix angle corresponds to a smaller pitch for threaded members of equal core diameter and thread-defining element radial projection.

D. The term "carbon fibers" as used herein refer to fibers produced by the heat treating of both natural and synthetic fibers of material such as, for example, wool, rayon, polyacrylonitrile (PAN) and pitch at temperatures on the order of 1000° C. or higher.

E. The term "graphite fibers" as used herein refer to fibers produced by the heat treating of carbon fibers at graphitizing temperatures on the order of 2000° C. or more.

F. "Pyrolytic material" as the term is used herein refers to carbon or ceramic material that is deposited on a substrate by pyrolysis of a carbon precursor or ceramic precursor.

G. "Pyrolytic carbon" as the term is used herein refers to carbon material that is deposited on a substrate by pyrolysis of a carbon precursor.

H. "Pyrolytic graphite" as the term is used herein refers to carbon deposited from a hydrocarbon over the temperature range of 1750° to 2250° C. It is a specific high temperature form of pyrolytic carbon.

I. "Pyrolytic infiltration" as used herein is a term used to describe densification processing of porous fibers and particulate substrates. Common processes are chemical vapor deposition (CVD) and chemical vapor infiltration (CVI). Carbon and ceramic materials may be formed in situ using such processes.

J. "Carbonaceous" as used herein refers to a material containing or composed of carbon.

K. "Carbonizable" as used herein refers to organic material which, when subjected to pyrolysis, is converted to carbon.

L. "Ceramic" as used herein refers to inorganic non-metallic materials.

The design, manufacture, use and properties of carbon/carbon composite materials may be exemplified by the following patents:

| Patentee | Patent No. | Issue Date |
| --- | --- | --- |
| Bauer | U.S. Pat. No. 3,991,248 | November 9, 1976 |
| Stover | U.S. Pat. No. 4,400,421 | August 23, 1983 |
| Harder | U.S. Pat. No. 4,567,007 | January 8, 1986 |
| Vasilos | U.S. Pat. No. 4,613,522 | September 23, 1986 |
| Strangman et al | U.S. Pat. No. 4,668,579 | May 26, 1987 |
| Shultz | U.S. Pat. No. 4,576,770 | March 18, 1986 |
| Yeager et al | U.S. Pat. No. 4,659,624 | April 21, 1987 | and the following articles from open literature:

1. Eric Fitzer, "Carbon Fibers-the Miracle Material for Temperatures Between 5 and 3000k", High Temperatures-High Pressures., 18 (1986) 479–508.
2. E. Fitzer and W. Huttner, Structure and Strength of Carbon/Carbon Composites", J. Phys. D: Appl. Phys., 14 (1981) 347–71.
3. Eric Fitzer, "The Future of Carbon/Carbon Composites", Carbon, 25 (1987) 163–190.
4. Donald M. Curry, H. C. Scott and C. N. Webster, "Material Characteristics of Space Shuttle Reinforced Carbon-Carbon", 24th National SAMPE Symposium, P. 1524 (1979).
5. H. M. Stoller, B. L. Butler, J. D. Theis, M. L. Lieberman, "Composites Research and Development Department", Sandia Laboratories, Albuquerque, N.M. Fall Meeting AIME (1971).

Materials

The first component of carbon/carbon composite fasteners according to the invention is carbon fiber which is present in an amount from about to about 70% by volume. While any carbon fiber, including graphite fiber may be employed, is preferable to use carbon fiber prepared from PAN (polyacrylonitrile) or pitch. Examples of suitable fibers include those available from Courtaulds-Grafil under the brand name GRAFIL XAS, from Hercules, Inc. under the brand names AS-4, HMS, UHMS (PAN-base), from Amoco Performance Products, Inc. under the brand name THORNEL T-300 (PAN-base) and P-25 (Pitch-base), from BASF under the brand name CELION (PAN-base), and from E. I. duPont de Nemours & Company types E-75 and E-100 (Pitch-base). The denier of the fiber preferably ranges from 250 to 3000. The particular fiber chosen and the amount of fiber employed is dependent upon the properties sought in the completed composite fastener and the cost that the manufacturer is willing to incur in obtaining such properties. Use of greater quantities of fiber of the same structural properties will result in composite fasteners according to the invention having increased performance. Use of equal amounts of fibers having increased resistance to rupture and fatigue can be expected to result in composite fasteners having increased performance.

Continuous tows of carbon fibers or staple or blends of staple and continuous fibers may be employed. In the latter instance the staple is arranged to form a yarn or tow for use in the manufacturing processes.

The diameter of the carbon fibers is believed to not be critical. Typically commercially available carbon fibers sold for use in the manufacture of carbon/carbon composites range in diameter from about 4 to about 10 microns. All are deemed suitable for use in the present invention. However, pitch-based fiber having a 10 micron diameter may be difficult to form around corners such as those encountered in forming a fabric reinforcing layer overlying a thread-defining element.

A second component used in manufacture of carbon/carbon composite fasteners according to the present invention is a binder system. The binder system includes an organic resin and optionally an organic solvent for the resin. The organic resin functions at temperatures below its decomposition temperature as a tackifier and adhesion enhancing agent to adhere the carbon fibers as they are laid up into the form of the carbon/carbon fastener being manufactured to one another and to the core where appropriate. An organic solvent may be employed to enhance wetting and flow of the organic resin into the tow of carbon fiber. Particularly preferred resins are phenolic resins and coal tar pitch which have carbon char yields of from about 50 to about 90% respectively although any organic polymer precursor material which can be pyrolyzed provide carbon having carbon content of from about 40 to about 95% by weight is acceptable. Also useful are polyimide and furane resins. From about 20 to about 60% by weight of such an organic polymer precursor material is typically employed as a binder for the carbon fibers. Other suitable binders may be considered as only temporary binders because upon reaching decomposition temperature they essentially volitalize leaving behind little or no carbon char. Exemplary of such temporary binders are polyvinyl alcohols and most epoxies.

Externally Threaded Member and Manufacture Thereof

There are two principal methods by which an externally threaded member may be prepared: (1) including a thread-defining element in a braided fabric layer and (2) application of a helical thread-defining element followed by application of a reinforcing fabric layer which overlies the thread-defining element.

FIGS. 1A, 1B, 1C, 1D, 1E, 1F depict various embodiments of and the manufacture of externally threaded composite members according to the present invention via braiding operations.

Figure 4:
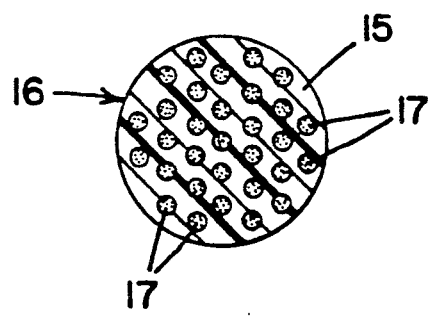
FIG. 4 is a cross-sectional view of a preferred thread-defining element useful in the invention.
Figure 5:
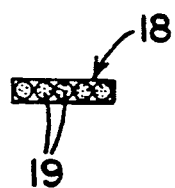
FIG. 5 is a cross-sectional view of a preferred non-thread-forming element useful in the invention.

In FIGS. 1B and 1C there is shown an embodiment of an externally threaded member 10 according to the present invention. Externally threaded member 10 includes an elongate core 12 and a tubular braided layer 14 which is bonded to the exterior surface of the core 12 by pyrolytic material such as carbon matrix. Braided layer 14 includes a thread-defining element 16 which extends in helical fashion around and along the exterior cylindrical surface of core 12. Thread-defining element 16 is also an integral part of tubular braided layer 14. Thread-defining element 16, which is individually illustrated in FIG. 4, is of greater radial projection than that of the other non-thread-defining elements 18, one of which is illustrated in FIG. 5, which form together with element 16 the tubular braided layer 14.

For a thread-defining element of a given size, the helix angle of the thread(s) varies directly with the size of the core. For a core of a given diameter, the helix angle of the thread-defining element varies inversely with the size of the thread-defining element. Helix angle of the thread-defining element(s) will generally range between 50 and slightly less than 90 degrees. The helix angle selected will be based on the materials employed in the manufacture of the fastener, the packing density of the fastener and the design requirements of the intended application for the fastener.

Core rod 12 is preferably cylindrical although other cross-sectional configurations may be used such as hexagonal and those polygons having a more than six sides or oval. The core 12 may be solid as illustrated or hollow (not illustrated). Selection of the core is based primarily on intended end use according to the in-service properties required for such application. In low temperature and low stress applications, it is adequate to utilize a core formed of graphite such as, by way of example and without limitation, Stackpole 2301 available from Stackpole Carbon Company. Where greater strength is desired or necessary, the carbon or graphite matrix of the core may be filled with discontinuous or continuous carbon fibers. Where greatest tensile strength is desired, the core is preferably formed of axially extending continuous carbon fibers bonded with a carbon matrix. Where greatest tensile strength is desired, the fibers must have a minimum length at least equal to that required to achieve full bond strength to the matrix to avoid pullout during tensile loading. The axially extending fibers extend in the lengthwise direction of the core. In many applications, however, the fastener will be subjected mainly to shear loading rather than tensile loading. In these applications, staple fibers may be adequate. The fibers of the core 12 may have a Young's modulus greater or lesser than that of the carbonaceous matrix in which they are embedded and by which they are bonded to one another.

A particularly suitable core for applications where high modulus and strength and temperature resistance are desired is a rod formed of continuous carbon filaments bonded in a carbon matrix. Such a core may be made by wetting or impregnating continuous filament carbon tow with a carbonaceous resin precursor, drawing the wetted tow through a circular die and thereafter baking the resin to cure it into a structurally rigid form. Pyrolysis is preferably not done at this time. Rather pyrolysis is preferably accomplished after application of the thread-defining element(s) and reinforcing fabric layer(s) to form a carbon matrix which bonds the continuous axially extending carbon fibers. Extruded/pultruded rod products are commercially available, for example, from Creative Pultrusions.

Thread-defining element 16 may be formed of any suitable carbonaceous fiber including those listed above. Eminently suitable are fibers of high Young's modulus and high strength such as THORNEL T-300 available from Amoco Performance Products, Inc. Fibers which are too brittle to bend to the desired radius of the threads are not preferred. A staple fiber tow such as Heltra Grafitex XAS is also highly preferred because it increases resistance to delamination.

The fibers may be treated to enhance resistance resistance to oxidation and/or bonding to the carbon matrix. Such treatment is not within the scope of the present invention but is well known to those skilled in the manufacture of carbon fiber reinforced carbon composites.

As shown in FIG. 4, the thread-defining element 16 may itself be formed of a plurality of sub-elements 17 such as carbon fibers of generally rounded cross-sectional configuration. The fibers 17 are encapsulated with a polymeric material which is later pyrolyzed into a carbon matrix after formation of the externally threaded fastener. The fibers 17 may be twisted together into a yarn. A plurality of yarns may be twisted into a cord. A plurality of cords may be twisted to form a larger thread-defining element. A plurality of bundles of fibers or a plurality of yarns or a plurality of cords may themselves be braided to form a thread-defining element. Thread-defining element 16 should be resistant to deformation from its rounded cross-sectional configuration to ensure that element 16 projects radially outwardly from core 12 an amount greater than the remainder of the elements 18 of braided layer 14. In certain preferred embodiments, element 16 is of circular cross-sectional configuration prior to its application to the core and following application to the core is approximately of D-shaped cross-sectional configuration, being deformed slightly where it is brought into contact with the core. Element 16 should be resistant to substantial deformation from such circular cross-sectional configuration as it is braided onto core 12. These characteristics of element 16 may be achieved by forming element 16 of tightly compacted fibers and/or pre-impregnating the sub-elements 17 with carbonaceous polymeric resin to form a solid circular bundle.

As shown in FIG. 5, each of the non-thread-defining elements 18 of braided layer 14 is preferably of flattened cross-sectional configuration. The non-thread-defining elements 18 may be formed of any suitable carbon fiber twisted or untwisted, formed into yarn or cord or braided into a flattened strip. The non-thread-defining elements may be impregnated with a carbonizable resin prior to forming braided layer 14. As shown, a plurality of continuous carbon filament sub-parts 19 are positioned side-by-side to form non-thread-defining element 18.

Figure 1D:
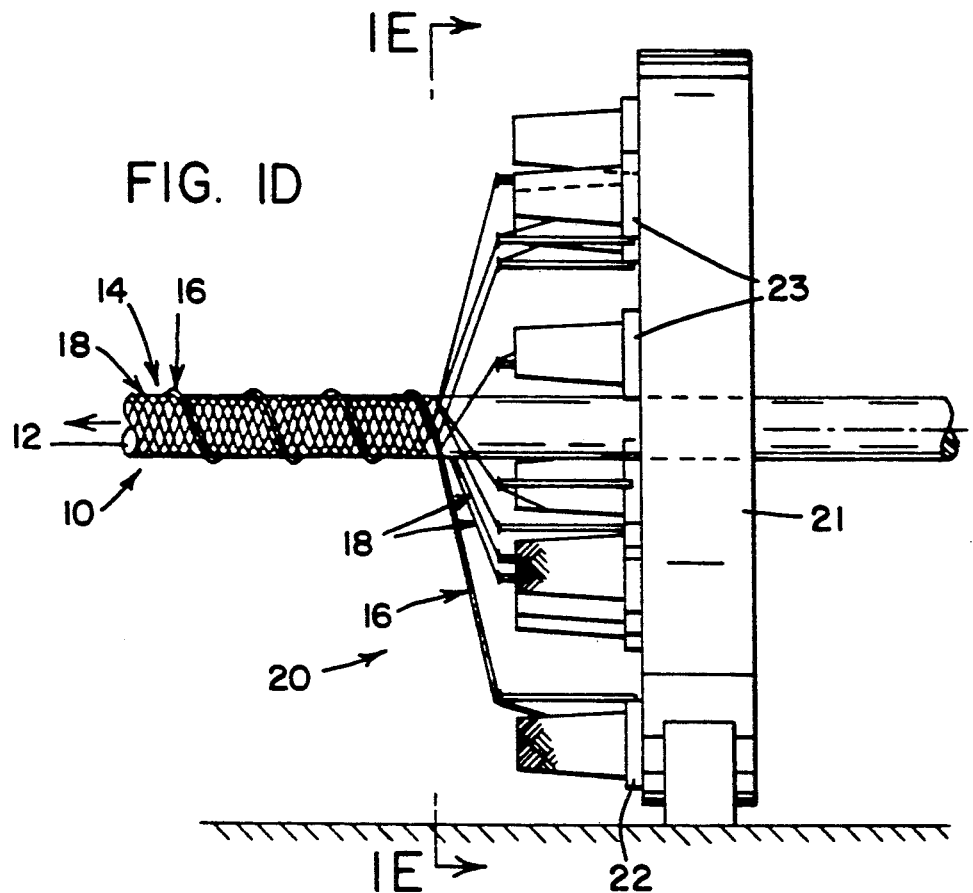
FIG. 1D is a sideview schematically depicting manufacture of a composite threaded member according to the present invention.
Figure 1E:
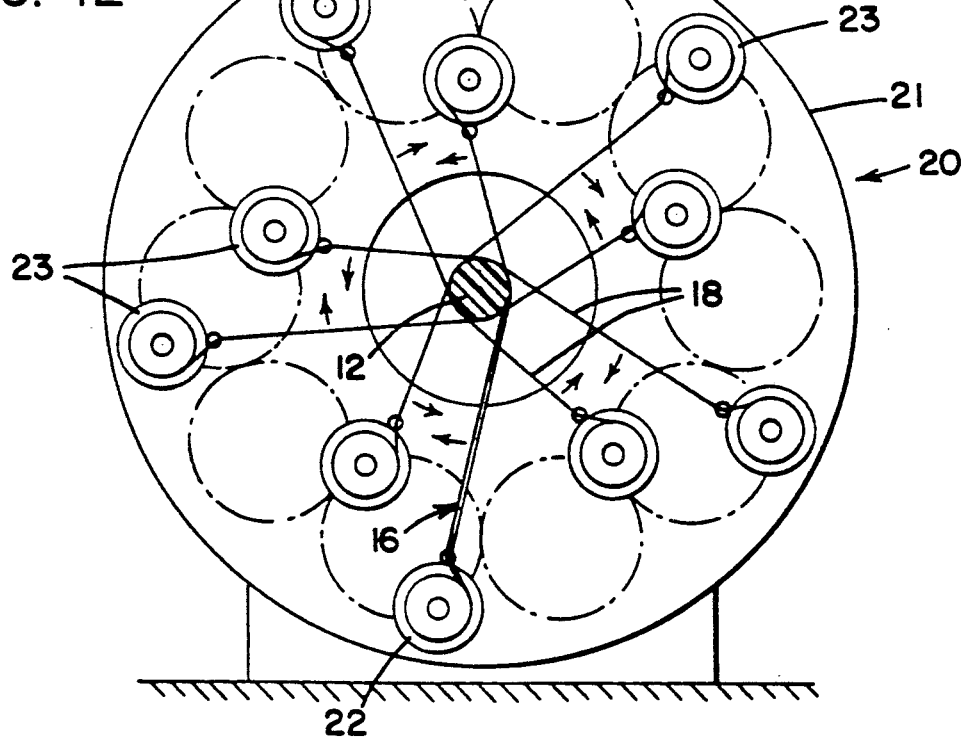
FIG. 1E is a sectional view taken along line 1E—1E of FIG. 1D.
Figure 1F:
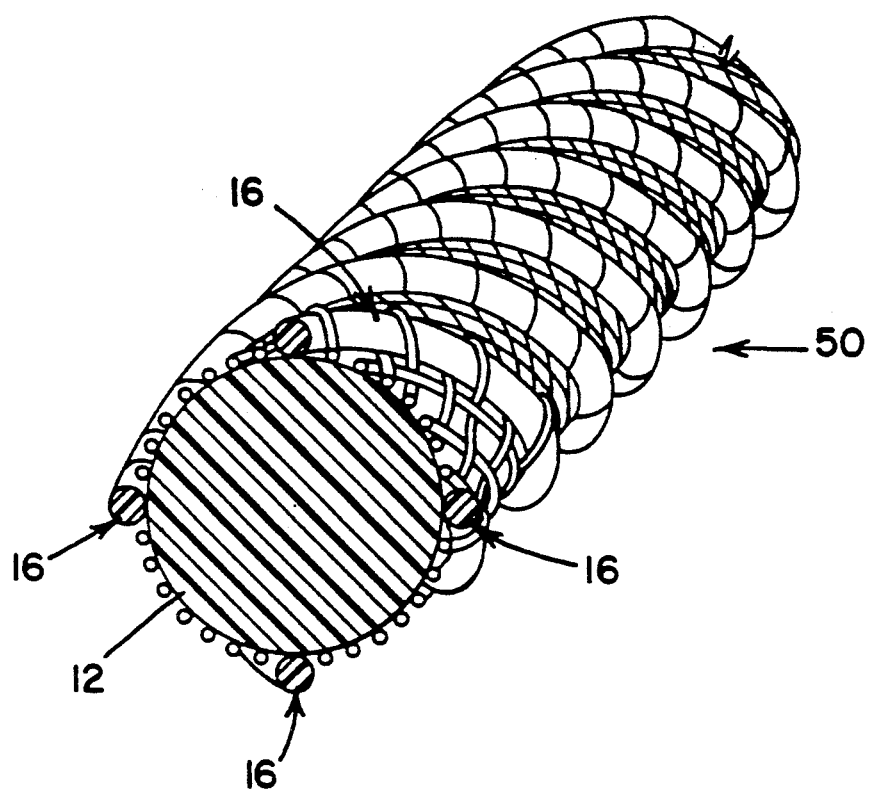
FIG. 1F is an isometric view of an alternate embodiment of a threaded member according to the present invention.

In FIG. 1F, there is shown an alternate embodiment of a threaded member 50 according to the present invention. Threaded member 50 differs from that depicted in FIGS. 1B and 1C in that it includes a plurality of thread-defining elements 16, each of which extends helically along core 12. Threaded member 50 retains a significant portion of its holding power in the event that one or more of its thread-defining elements 16 are damaged or broken. While four thread-defining elements 16 are illustrated, a greater or lesser number could be employed.

The manufacturing process utilized in the preparation of the embodiments illustrated in FIGS. 1B, 1C, 1F is illustrated in part in FIGS. 1D and 1E. A conventional tubular braiding apparatus 20 contains a desired number of yarn or cord carriers in its deck 21. The number of carriers is not critical. The number of carriers needed for complete coverage of the surface of the core 12 increases with the size of the core in a manner well known to those skilled in the art of tubular braiding. For fasteners of up to about 1" (2.54 cm) diameter, commonly available twenty-four to thirty-six unit single deck braiding machines may be employed to obtain full coverage of the core 12 with braided layer 14. According to the present invention, one or more selected carriers 22 are fitted with a spool of thread-defining element 16, one being shown in FIGS. 1D and 1E for simplicity of illustration. Selected ones or all of the remainder of the carriers 23 are fitted with spools of non-thread-defining element 18, like those shown in FIG. 4. As core member 12 is passed through the deck 21 of braider 20, the reinforcements 16 and 18 are braided on to the core. As a result of the braiding action, the thread-defining element 16 is secured to core 12 by a plurality of non-thread-defining elements 18 which envelop the core 12 in an opposite sense helical pattern from that of thread-defining element 16. Viewed from the perspective of one traveling along the helical path of the thread-defining element 16 upon core 12, thread-defining element 16 is at some points overlapped by non-thread-defining elements 18 pass between thread-defining elements 16 and the core 12. In this manner the thread(s) of the externally threaded composite member is reinforced with fibers which extend across the direction of the thread(s) as well as with fibers which extend in the direction of the thread(s).

The outer cylindrical surface of core 12 may be coated with or formed of a thermoplastic or thermosettable polymer capable of being pyrolyzed into carbon matrix. The surface of the core may be heated to promoted embedment and bonding of elements 16 and 18 to the core during formation of the braided layer. A liquid bonding polymeric resin may be applied to the core prior to or subsequent to the core being passed through the braider. A phenolic or epoxy resin may be utilized for this purpose.

Preferably the elements of the braided layer are arranged in a tubular braided layer such that the tubular braided layer is stable against rotation when a tensile load is applied in the lengthwise direction of the core. In other words a torque is not generated upon application of a tensile load to the ends of the combined core and tubular braided layer. Interlaminar shear resistance between the braided layer and the core may be increased by using staple fibers.

After the braiding operation the composite member may be consolidated by application of heat and pressure, for example, in an autoclave. Preferably additional carbon bearing resin is applied subsequent to braiding layer to the core. A distinct abrasion resistant layer of resin may be applied subsequent to bonding of the braided layer.

Having reference to FIG. 1A there is shown schematically the overall process utilized in the manufacture of externally threaded carbon/carbon composite members according to the invention. The process begins with provision of a core as described hereinabove which is passed through a braiding machine such as that shown in FIGS. 1D and 1E to form upon the core a braided layer from one or more thread-defining elements and a plurality of non-thread-defining elements. Each of thread-defining elements and non-thread-defining elements is formed from fibrous material and preferably polymer material. Subsequent to formation of the thread-defining elements and non-thread-defining elements they may be polymer coated or impregnated prior to or upon application to or subsequent to application to the core in the form of a braided layer. After formation of the braided layer, it is preferably consolidated with the core by application of pressure and heat such as in an autoclave. The amount of heat applied at this temperature is not so great as to effect pyrolysis of the binder materials but sufficient to effect curing of any resin bonding materials to bond the carbon fibers of the braided layer to the core. As appropriate, a bakeout cycle may be employed to cause controlled decomposition of the carbon bearing resins utilized in manufacture. Thereafter the temperature is elevated to cause complete pyrolysis and form a carbon matrix. Thereafter conventional CVD/CVI or impregnation operations are undertaken to infiltrate and strengthen and densify the combined core and braided layer by the in situ deposition of additional carbon to form an externally threaded carbon fiber reinforced carbon composite member.

Figure 2A:
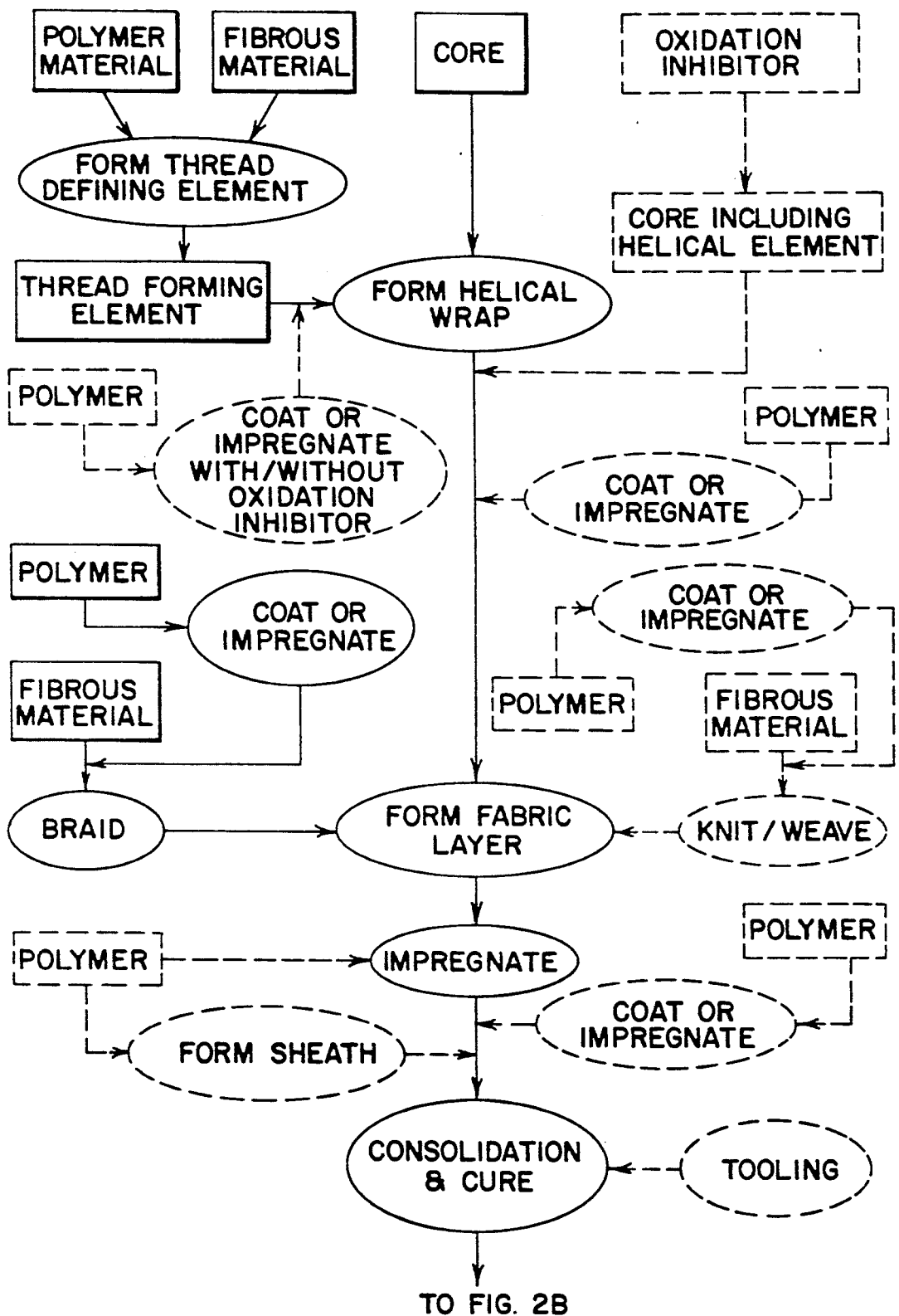
FIGS. 2A and 2B together form a flowchart depicting schematically in solid lines a preferred process and in dashed lines process variations and alternatives for the manufacture of certain embodiments of externally threaded composite members according to the present invention.
Figure 2B:
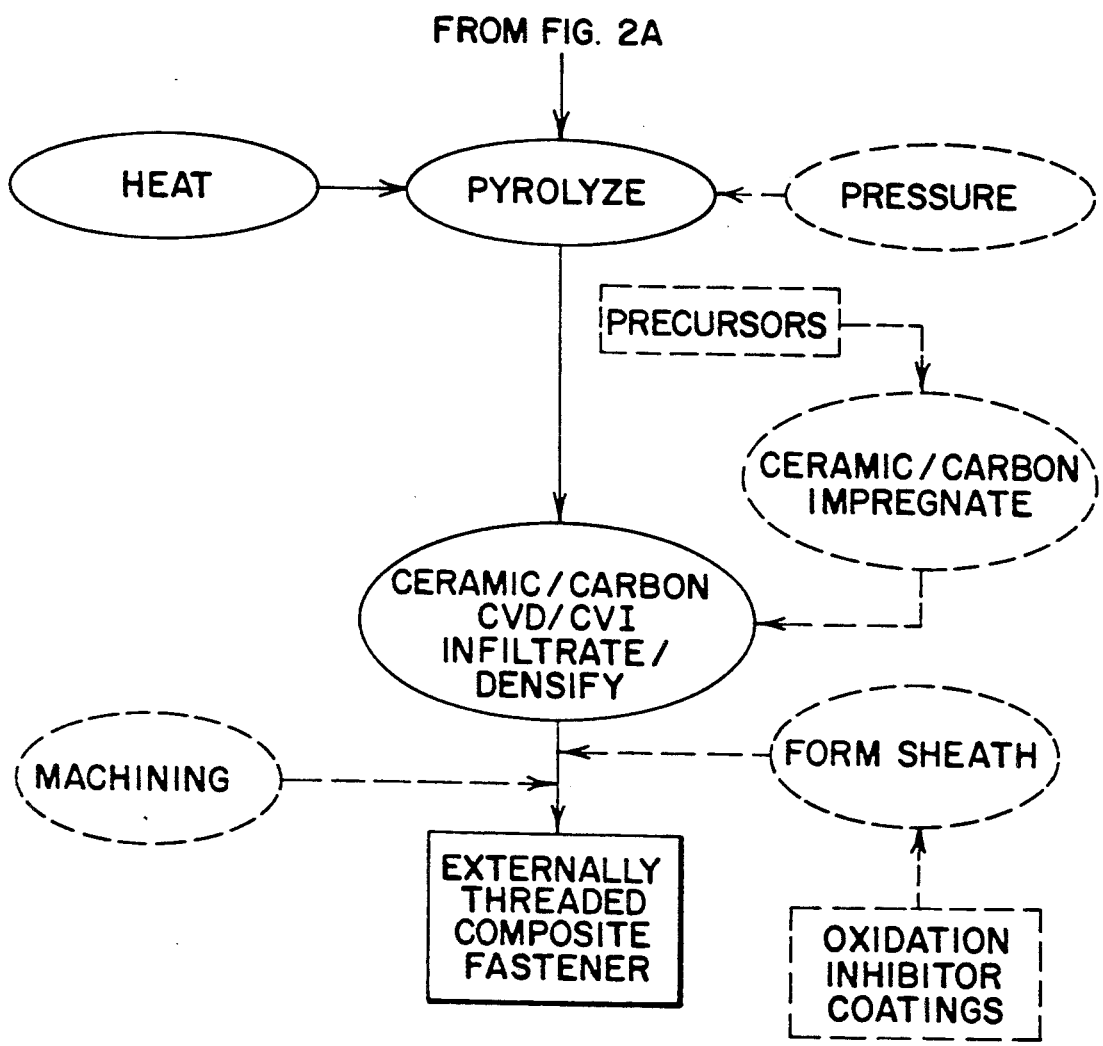
Figure 2C:
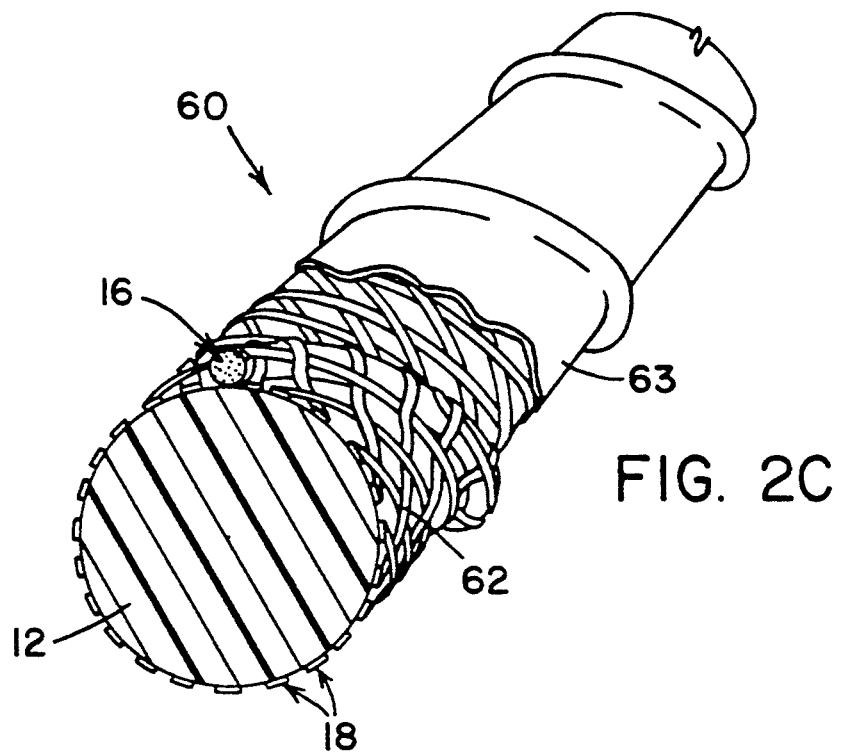
FIGS. 2C and 2D are respectively a perspective view and a side view with parts broken away of an embodiment of an externally threaded composite member made in accordance with the present invention.
Figure 2D:
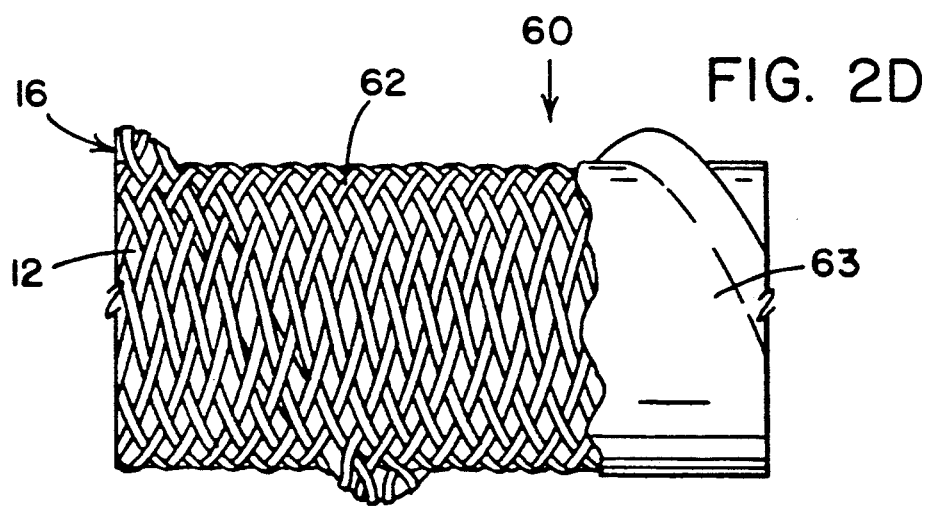

In FIGS. 2A, 2B, 2C, 2D and 2E there is shown an alternate embodiment of an externally threaded carbon fiber reinforced carbon matrix fastener according to the invention and a method for its manufacture. As shown in FIGS. 2C and 2D, there is shown an alternate embodiment of an externally threaded carbon composite member 60 according to the invention. Externally threaded member 60 includes an elongate core 12, a thread-defining element 16 which extends in helical fashion around and along the exterior cylindrical surface of core 12 and a reinforcing fabric layer such as braided layer 62 which envelopes, conforms to and is bonded to the outer surface of the combined core 12 and thread-defining element 16. Thread-defining element 16 is of greater radial projection than that of the other non-thread-defining elements such as flat bundle braiding elements 18, one of which is better shown in FIG. 5, which are formed into tubular braided fabric layer 62. Preferably the thread-defining element 16 is integral with or bonded to the core 12.

The core 12 is a rod as previously described hereinabove. Additionally, the core may include one or more layers of braided or knit fabric or at least two layers of opposite sense helical fiber reinforcements to render the core resistant to torsional loading or fibrous reinforcements which extend in the lengthwise, i.e., the axial direction of the core. A preferred thread-defining element is formed of continuous carbon fibers in a carbonaceous matrix. However, thread-defining element 16 may be integrally formed with core prior to presentation of the core for formation of the reinforcing fiber layer thereon. Thread-defining element 16 is preferably applied to the core helically by a spiral wrapping machine 74 such as that shown in FIG. 2E. Thread-defining element 16 may be formed of short carbon fibers or continuous fibers. As shown in FIG. 4, a preferred thread-defining element is itself formed of a plurality of sub-elements which are continuous carbon fibers of generally rounded cross-section of configuration which are coated with carbonaceous polymeric precursor resin which is pyrolyzed subsequent to layup on the core.

Alternatively, a thread-defining element may be formed of particulate carbonaceous material in a carbonizable resin or pitch or fiber alone or a combination of carbon fiber and carbon precursor materials which are extruded or molded on to the core.

The entire manufacturing process of the aforedescribed alternate embodiment for formation of an externally threaded member according to the invention is shown schematically in FIGS. 2A and 2B; a portion of the manufacturing process for certain embodiments is further illustrated in FIG. 2E. Apparatus 70 contains in functional sequence a spiral wrap machine 74 and a fabric layer forming machine such as braider deck 76 shown in solid lines or knitting machine 84 shown in dashed lines. Braider deck 76 is conventional and includes a desired number of yarn or cord carriers. The number of carriers is not critical. The braiding machine described hereinabove in regard to FIGS. 1D and 1E may be utilized for this operation. Each of the carriers 77 is fitted with a spool of continuous non-thread-defining element such as flat bundle element 18 shown in FIG. 5.

As core member 12 is passed through apparatus 70 thread-defining helical element 16 is spirally wrapped on to core 12 by spiral wrap machine 74 and thereafter a reinforcing fabric layer 62 is formed by braider deck 76 which braids the braiding elements on to the spiral wrapped core. The thread-defining element 16 is temporarily bonded to the core with a carbonaceous polymeric resin. Thread-defining element 16 is also secured to the core by a plurality of non-thread-defining elements 18 which envelope the combined core 12 and helically extending thread-defining element 16 in the same and in opposite sense helical patterns from that of that of the thread-defining element 16. Thread-defining element 16 is overlapped by non-thread-defining elements 18 of fabric layer 62. Fabric layer 62 closely conforms to and follows the outer surface contours of the combined core 12 and thread-defining helical element 16.

Still having reference to FIG. 2E, there is shown in dashed lines an alternate means for forming a reinforcing fabric layer which overlays and closely conforms to the spirally wrapped core. The combined core 12 and helical thread-defining element 16 may be passed through conventional knitting machine 84 which forms a tubular knit reinforcing fabric from yarns 85 provided on carriers 86.

FIGS. 2A and 2B schematically depict overall processes for the manufacture of externally threaded composite members according to the invention. The core, as previously discussed, may or may not include a helical thread-defining element at the start of the process. If no helical thread-defining element is present on the core, one is applied, for example, on without limitation by spiral wrapping or extrusion of carbonaceous or carbon precursor material. The thread-defining element may be formed of polymeric material alone, fibrous alone, or a combination of polymer and fibrous materials. Where highest strength and performance is required, continuous filaments of carbon fiber in a tow are employed. The thread-defining element may be polymer resin coated or impregnated prior to or subsequent to its application to the core.

The outer cylindrical surface of the core may be coated with or formed of a thermoplastic or thermosettable polymer which may be pyrolyzed in subsequent steps. The surface of the core may be heated to promote embedding and bonding of the helical thread-defining element and fabric layer to the core. A liquid polymeric bonding resin may be applied to the core prior to or subsequent to the core being passed through a spiral wrap machine and fabric layer forming apparatus. Over the combined core and thread-defining helically extending element there is formed a layer of reinforcing fabric, preferably by braiding or knitting in the manner illustrated in FIG. 2E. Fibrous material used in forming the reinforcing fabric layer may be coated or impregnated with carbonaceous base polymer prior to use to aid in bonding the fibrous material to the combined core and thread-defining element. The combined core, thread-defining element and fabric layer are secured to one another, preferably by chemical bonding with a carbon base polymeric resin.

Preferably the fibrous elements forming the reinforcing fabric layer are arranged in the tubular fabric layer such that the fabric layer is stable against rotation when a tensile load is applied in the lengthwise direction of the core. In other words, the reinforcing fabric layer elements are arranged such that a torque is not generated which tends to rotate the core when a tensile load is applied to the core.

After formation of the reinforcing fabric layer, the composite member being formed may be consolidated by application of heat and pressure, for example, in an autoclave. This consolidation step forces the reinforcing fabric to more closely conform to the contours defined by the underlying combined core and thread-defining element. Additional polymeric resin may be applied subsequent to the fabric layer to form a sheath 63 which coats and protects the underlying structure against abrasion and to promote bonding of the braided layer to the core. Multiple applications of polymer resin may be employed to build up a protective sheath 63. A distinctly different resin selected primarily for its abrasion resistance may be applied subsequent to bonding of the reinforcing fabric layer.

After formation of the fabric layer on the combined core and helical thread-defining element, conventional processing steps such as CVD/CVI or impregnation operations are undertaken to strengthen and densify the part being manufactured. Multiple cycles of impregnation or infiltration with liquid containing polymeric resin which is carbonizable upon pyrolysis may be employed. As appropriate, a cure cycle and a bakeout cycle may be employed to cause controlled decomposition of the carbon bearing resins utilized in manufacture. Thereafter, the temperature is elevated to cause complete pyrolysis and form a carbon matrix. Where highest strength is required, CVD/CVI processes are employed for infiltration and densification of the part being manufactured. As stated hereinabove, a sheath of abrasion resistant polymeric resin may be applied before or after final pyrolysis steps, depending on intended application to result in an externally threaded carbon fiber reinforced carbon matrix composite fastener.

Composite Nut and Bolt and Manufacture Thereof

In FIGS. 3D, 4D, 3E, 4E there are shown embodiments of internally threaded members 110, 111, and 112 respectively according to the invention. Hollow internally threaded member 110 is formed of a carbon fiber reinforced carbonaceous matrix. The interior surface of threaded member 110 includes an integral thread having a rounded apex. The thread includes a reinforcing fabric layer which extends in the axial direction of the internally threaded member 110 and conforms to the contour of the internal thread thereof.

Figure 3E:
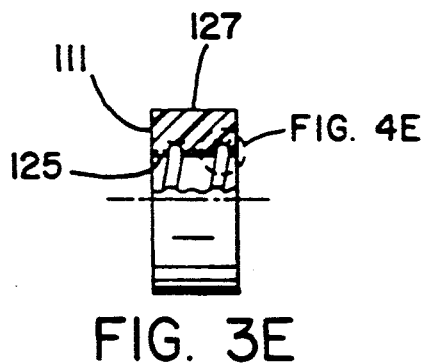
FIG. 3E is a side elevational view of an internally threaded member according to the invention cut from the member shown in FIG. 3D.
Figure 4E:
FIG. 4E is an enlarged view of the encircled region of FIG. 3E.
Figure 3F:
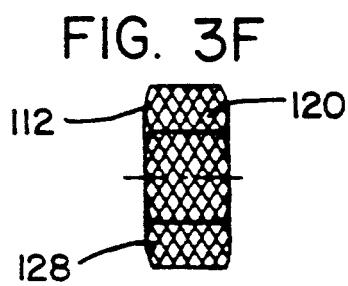
FIG. 3F is a side elevational view of a hex nut according to the present invention.

In FIGS. 3E and 4E there are shown an internally threaded member like that shown in FIGS. 3D and 4D, the difference being that the member 111 has been sliced from a greater axial length member such as member 110. The exterior axially extending surfaces of members 110 and 111 are cylindrical. FIG. 3F shows a hexagonal internally threaded member or nut 112 which has internal reinforced thread 126 like members 110 and 111.

The interior surface 125 in members 110, 111, 112 includes a helical thread 126 extending in its lengthwise or axial direction. The thread-reinforcing fabric layer 106 is undulate and conforms to and extends throughout the contour of the threaded interior surface 125 of members 110, 111, 112. The thread-reinforcing fabric layer 106 is preferably a continuous tubular fabric layer formed in the manner shown in FIGS. 3C and 4C by braiding or knitting suitable high modulus carbon fibers. Preferred are continuous fibers of high Young's modulus such as those described hereinabove with respect to formation of the core and externally threaded members. The fibers chosen, of course, must not be so brittle as to be largely destroyed during formation of the fabric layer.

In FIGS. 3G, 4G and 3H, 4H there is shown a composite bolt or cap screw 120 according to the invention which has been formed by threadedly joining an internally threaded member such as nut 112 to a separately formed externally threaded composite member 121 such as that described hereinabove and shown in FIGS. 1 and 2. Nut 112 is threaded on to threaded shank 121 and is bonded with adhesive 122 to prevent further rotation of nut 112 relative to shank 121. Bonding for lower temperatures applications is accomplished with thermosetting polymeric material such as phenolic or epoxy or other matrix, including a matrix containing ceramic particulates and/or precursors. Pyrolysis of the combined nut and bolt and subsequent exposure to known techniques for CVD/CVI or liquid resin impregnation carbonization/densification may be employed to permanently bond nut 112 to externally threaded composite member 121.

Figure 3G:
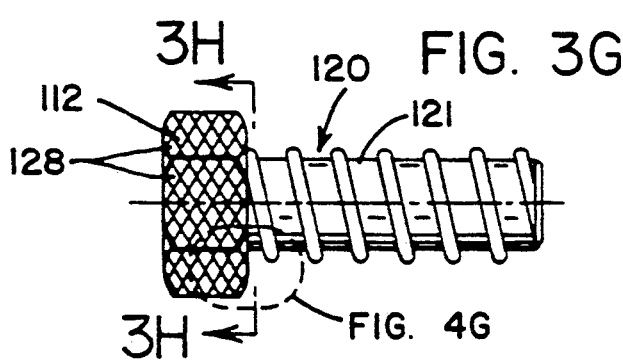
FIG. 3G is a side elevational view of a composite bolt according to the present invention.
Figure 3H:
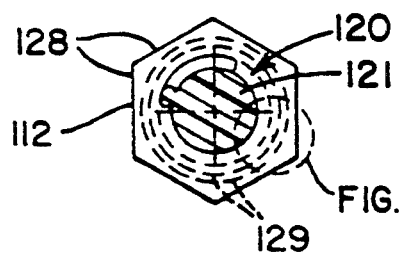
FIG. 3H is a sectional view taken along line 3H—3H of FIG. 3G.
Figure 3I:
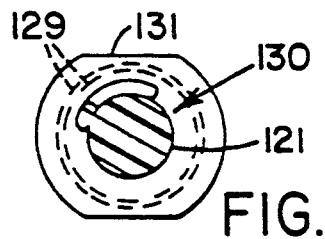
FIG. 3I is sectional view taken transversely to the lengthwise direction of an alternate embodiment of a composite bolt according to the invention.

In FIG. 3I, there is shown an alternate embodiment of a composite bolt or capscrew 130 includes according to the invention which has been formed by threadly joining an internally threaded member such as nut 131 to a separately formed externally threaded composite member 121. The head of capscrew 130 includes diametrically opposite flatted areas adapted for engagement with a torque transmitting tool such as a wrench.

In FIG. 3A, there is shown a manner of manufacture according to the invention of an internally threaded member according to the invention. An externally threaded cylindrical core such as core 100 depicted in FIGS. 3B, 4B is used as a carrier and mold for formation of an internally threaded member such as member 110 depicted in FIG. 3D. Core 100 must include an exterior surface 101 which will not bond to the internally threaded member to be formed except where it is desired to form directly a threaded bolt or the like such as that depicted in FIG. 3G. The externally threaded cylindrical core 100 is surface treated with release agent 102 as shown in FIGS. 3A and 3B, 4B.

Where core 100 is merely a mandrel used in production of internally threaded members of the invention, the core may be formed of any suitable material including wood, plastic or metal, or a composite externally threaded member of the invention. For improved consolidation during curing, an expandable mandrel may be employed.

Thereafter, one or more reinforcing fabric layers are formed on core 100. This is preferably accomplished as shown in FIG. 3C by passing core 100 through a tubular braiding or knitting machine or succession of such machines. Braiding or knitting machine 104 is provided with a plurality of carriers each letting off a continuous tow of fibrous material 105 which is laid up into a tubular reinforcing fabric layer 106 on core 100. The reinforcing fabric layer 106 envelopes and conforms to the contours defined by the helical threads of the outer surface 101 of core 100.

The reinforcing fabric layer 106 is multi-directional in character; it has fibrous elements which extend at differing angles relative to the axial direction of the internally threaded member being formed, at least some of the fibrous elements extend generally in the same direction as the helical threads and others of the fibrous elements extend generally in a direction opposite to that of the helical threads. As shown in FIG. 3C, the fibrous elements of fabric layer 106 extend in equal but opposite sense angles relative to the axial direction of the internally threaded member being formed, the angles being of lesser magnitude than the helix angle of the thread on core 100.

A sheath or covering 108 of polymeric matrix is applied to the combined externally threaded core and fabric layer 106. The externally threaded member may be precoated or impregnated with carbonizable polymeric material, ceramic material or a precursor of either subsequent to formation of the fabric layers. The fabric layers themselves may be coated or impregnated. Alternative processes include pyrolysis at this point of the part being manufactured prior to formation of a matrix sheath.

While formation of a single reinforcing fabric layer 106 is depicted in FIG. 3C, a plurality of reinforcing fabric layers may be sequentially formed each upon the preceding underlying reinforcing fabric layer. Any of these reinforcing fabric layers may be knit, braided, spiral-wrapped in opposite sense directions, or extruded. A combination of these techniques may be employed in the manufacture of a single fastener. For example, extruded layers of matrix or matrix precursor may be interleaved with tubular knit or braided layers. Matrix precursor material may be applied between application of each successive reinforcing fabric layer. Alternatively, matrix precursor material may be applied subsequent to the application of all of the reinforcing fabric layers such as by pressure impregnation. When applied, the matrix precursor material, if a liquid, must be of sufficient viscosity to remain with the fibrous material and not drip off the combined internally threaded member being manufactured and its underlying core. To avoid the tendency of the liquid matrix precursor material to run due to influence of gravity, the core and internally threaded member being manufactured may be rotated about the horizontally oriented longitudinal axis of the core 100.

After application of the final matrix or matrix precursor material which encapsulates and forms a sheath 108 upon the underlying reinforcing fabric layer such as 106, the assembly is preferably subjected to heat and pressure to consolidate and bond the matrix or matrix precursor and the fabric layers into a unitary, stable, internally threaded composite member such as member 110 shown in FIG. 3D. This may be conveniently accomplished in an ordinary autoclave. No external mold is required.

The assembly may be placed in a vacuum bag to effect consolidation. The consolidated assembly may be placed in an autoclave or oven to bond the polymeric matrix and fabric layers into a unitary threaded composite member. Alternately, the assembly may be consolidated while in the oven or autoclave.

Subsequent to the bonding operation, the combined internally threaded member and its core are removed from the autoclave. Thereafter the newly formed internally threaded member 110 is removed from core 100 by rotating member 110 relative to core 100. As shown in FIG. 3D, core 100 has been partially withdrawn from the right-hand portion of internally threaded member 110. The previously applied release agent 101 facilitates separation of internally threaded member 110 from core 100.

Subsequent to bonding and removal of the core, the part being manufactured may be subjected to pyrolysis and subsequently to known CVD/CVI infiltration and densification techniques to convert the matrix precursor into carbon or ceramic matrices which bond the carbonaceous or ceramic fibers into position.

Preferably, internally threaded member 110 is made of sufficient axial length such that it may be cut into a plurality of smaller internally threaded members such as internally threaded member 111 shown in FIGS. 3E, 4E. The exterior cylindrical surface 127 of member 111 may be machined to form a hexagonal outer surface 128 such as that shown for member 112 in FIGS. 3F, 3G, 4G and 3H, 4H. It is also possible to machine the exterior surface of internally threaded member 110 prior to slicing it into a plurality of hex nuts and prior to completion of the pyrolysis and densification steps.

Preferably a tubular fabric layer 128 is formed upon the exterior machined surface of the internally threaded member 110 to further reinforce member 110 against rupture during application of a torque through use of a tool such as a wrench. After application of fabric layer 128, the part being manufactured is subjected to additional pyrolysis and densification steps to fully develop its strength and rupture resistance.

Hex nut 112 includes a continuous helical thread 126 extending in the axial direction of nut 112 within its central aperture. Internal helical thread 126 is reinforced by reinforcing fabric layer 106 which conforms to the contour defined by external helical thread of core 100. As shown in FIGS. 3H and 4H, nut 112 includes a plurality of additional coaxial fabric reinforcing layers 129 distributed throughout its cross-sectional area radially outwardly of its thread-reinforcing fabric layer 106.

Figure 4G:
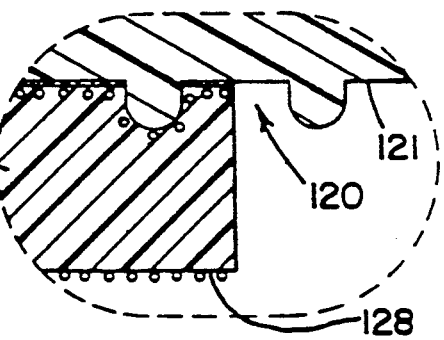
FIG. 4G is an enlarged sectional view of the encircled region of FIG. 3G.
Figure 4H:
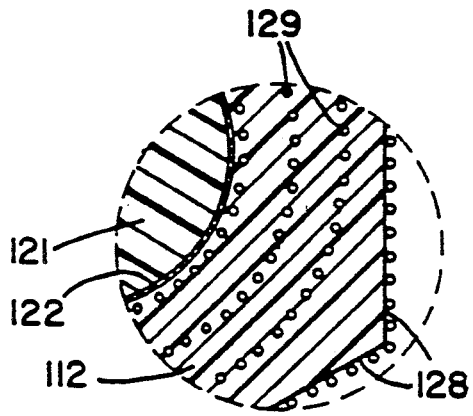
FIG. 4H is an enlarged view of the encircled region of FIG. 3H.

Nut 112 may be threadedly joined to an externally threaded composite member such as shank 121 shown in FIGS. 3G and 3H. The manufacture of members suitable for shank 121 is described in detail hereinabove and with regard to FIGS. 1 and 2 hereof. Nut 112 my be bonded to shank 121 with polymeric material 122 such as a phenolic or epoxy adhesive or ceramic based adhesive as appropriate to form composite bolt 120.

It is also possible to utilize resin materials which may be B-staged. Polyesters, phenolics and epoxies are examples of such resins. In this instance on optional process for formation of items such as bolt 120 depicted in FIGS. 3G and 3H includes B-staging the internally and externally threaded members such as the nut and shank prior to threadedly joining them and thereafter applying heat and pressure to consolidate the internally threaded member to the shank and effect a chemical bond therebetween.

Where a carbon fiber reinforced carbon matrix composite bolt or cap screw is desired, the assembly discussed and depicted with request to FIGS. 3G and 3H is subsequently pyrolyzed and subjected to known infiltration/densification procedures for the manufacture of carbon/carbon composite materials. In analogous manner, where a ceramic fiber reinforced composite is being formed, the assembly is subsequently subjected to known procedures for the conversion of ceramic precursor materials to ceramic matrices.

Due to the character of the reinforcing fabric layer 106 and the fact that it is undulate and thus closely conforms to the male pattern provided by threaded core 100, the internal threads of female member 110 and those derived therefrom are reinforced against rupture. Due to the multi-directional character of the fibers of the reinforcing fabric layer, at least some of fibers of the textile reinforcing material are oriented in planes at a considerable angle to the plane of the shearing forces acting on the internal threads of member 110.

Figure 3J:
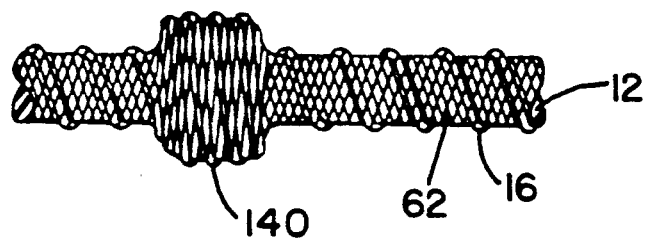
FIG. 3J is a side elevational view of a built-up head area on a threaded member according to the invention.
Figure 4K:
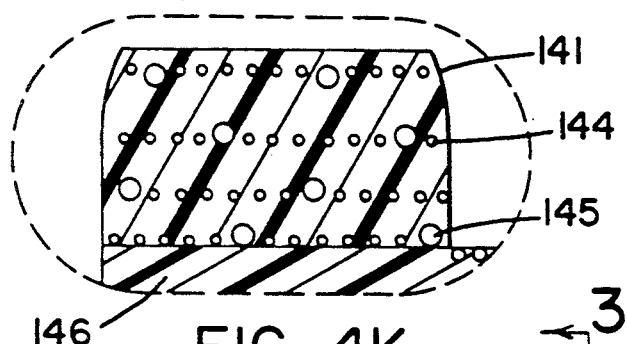
FIG. 4K is an enlarged sectional view of the encircled region of FIG. 3K.

Having reference to FIGS. 1D, 1E, 2E, it is possible to form an integrally built-up portion on the part being manufactured which will serve as a head of the fastener. This may be accomplished by slowing or momentarily stopping axial movement of the core 12 through the fabric forming operation. The resulting built-up portion 140 as shown in FIG. 3J may be machined or compression molded to form diametrically opposite flatted areas like those shown in FIG. 3I or a hexagonal head like that shown in FIGS. 3G and 3K or other shapes (not illustrated) adapted to be engaged by a torque transmitting tool (not illustrated). An additional tubular knit or braided layer may be added after machining. Alternately, a built-up portion may be obtained by successive passes through the fabric forming operation, including reverse movement of the core.

Figure 3K:
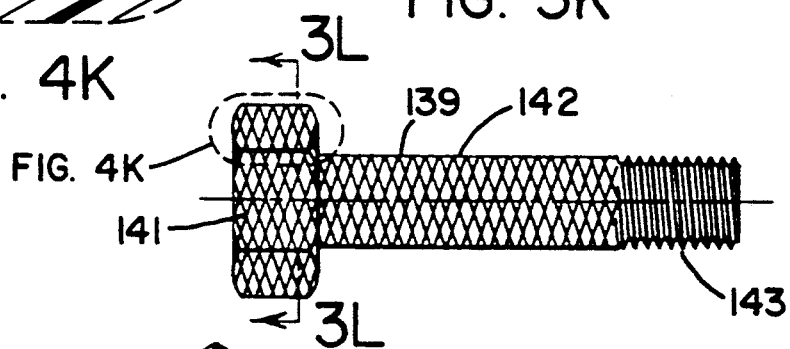
FIG. 3K is a side elevational view of a compression molded threaded member according to the invention.
Figure 3L:
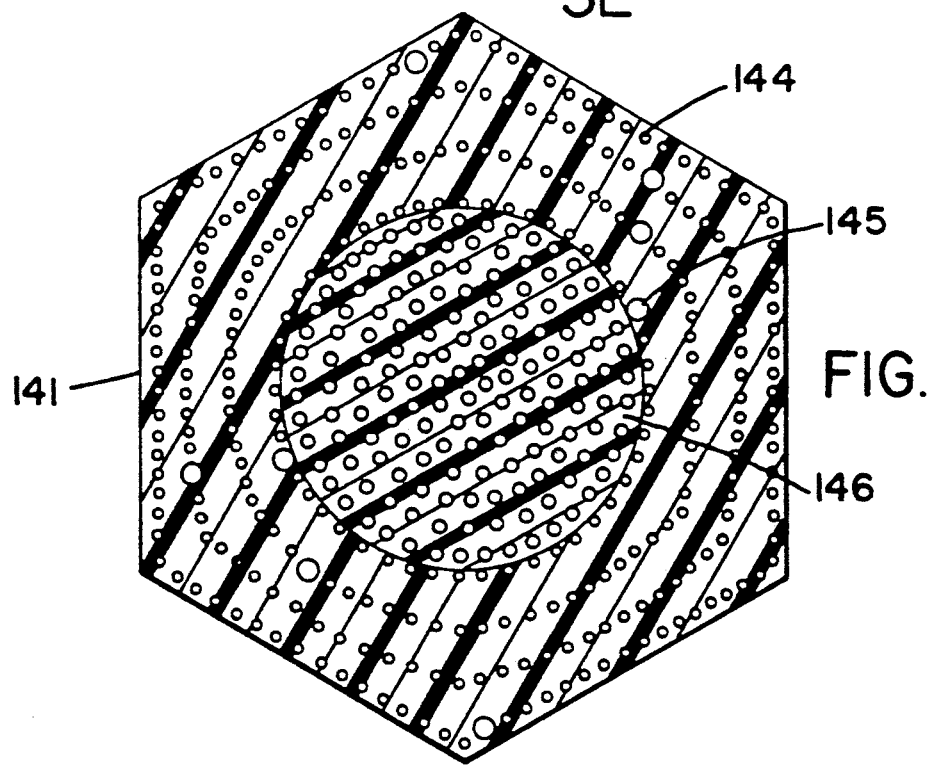
FIG. 3L is an enlarged sectional view taken along line 3L—3L of FIG. 3K.

In FIGS. 3K and 3L there is illustrated a composite fastener 139 according to a further embodiment of the invention. Fastener 139 is compression molded from a preform such as that illustrated in FIG. 3J. Fastener 139 includes helically extending fibrous reinforcement such as layers 144 and 145 throughout its head 141 as well as shank 142 and threaded portion 143. Core 146 extends through head 141. The angle of the threads in threaded portion 143 may correspond to that of the fibrous reinforcement. Compression molding of such a preform results in a composite fastener having dimensional precision. After curing in a mold, the part being manufactured is subjected to conventional bakeout and densification cycles.

Certain aspects of the invention will not be further illustrated by the following examples.

EXAMPLE 1

Twelve carriers of a twenty-four carrier tubular braiding machine were loaded with T-300 carbon yarns each having 12,000 filaments. As a wooden dowel rod of one fourth inch diameter was drawn through the deck of the braider, a tubular braided fabric layer was formed onto the dowel at about a 45 degree angle. The dowel with fabric layer was painted with a phenolic resin. Thereafter the painted assembly was placed in a vacuum bag at room temperature to consolidate the braided layer and remove entrapped air. After consolidation of the assembly, a second braided layer including an integral thread-defining element was formed thereon. For this second layer, two of the twelve carriers were loaded with 24,000 filament T-300 "shoestring" yarn which was previously braided using eight carriers each loaded with a 3000 filament yarn, and ten carriers were loaded with 3000 filament T-300 year. Phenolic resin was painted onto the second braided layer. After vacuum bagging, the assembly was cured for 3 hours at 250° F. Thereafter, the cured assembly was placed in a high temperature CVD/CVI furnace and densified at a temperature of about 1850° F. using flowing hydrocarbon-containing gas (natural gas) at subatmospheric pressure.

A hollow, externally threaded, cylindrical carbon/carbon composite member having two thread-defining elements was thereby produced. The wooden dowel rod shrank cleanly away from the inside of the composite threaded product.

EXAMPLE 3

A sample was prepared as described in Example 1 through preparation of a cured assembly. The cured assembly was placed in a high temperature CVD/CVI furnace and densified by in situ formation of silicon carbide (Sic) at a temperature of about 2050° F. using flowing methyltrichlorosile ($CH_3SiCl_3$) diluted with hydrogen at subatmospheric pressure. The product was a hollow, braided, carbon fiber reinforced, externally threaded rod having a silicon carbide matrix coating and bonding the fibers. Slight unraveling of the braided carbon fibers occurred during furnacing. The wooden dowel rod shrank and was lightly bonded to a portion of the interior surface of the product. The dowel rod was easily removed without apparent damage to the composite product.

EXAMPLE 3

A bolt having an integrally braided fiber reinforced head and compression molded threads was made as follows. A length of rope having several concentric braided layers of T-300 6K carbon fiber tow over a central tow strand was manually reformed adjacent one of its ends to create a preform having a bunched up area of greater diameter adjacent one end. The fiber content of the rope is estimated to be about 50 volume percent. The rope had a diameter of about one half inch (no tension applied). The entire preform was infiltrated with phenolic resin by immersion under vacuum for 30 minutes, then removed from the bath and dried overnight at 150° F. temperature. This infiltration cycle was repeated once. Thereafter the prepregged preform was placed in a metal mold which was placed in a heated platen press. The mold was designed to enable it to be split lengthwise into two pieces. The mold included a PTFE coated interior to aid in release of the molded and cured preform. The mold included an interior cavity defining a one-half inch shank diameter and 12 threads per inch at the end of the shank distal the head. The cured preform was loaded into a standard carbonization furnace and processed through a slow pyrolysis cycle to convert the cured resin to carbon. The resulting carbon/carbon bolt appeared similar to that shown in FIG. 3K except that the head was not hexagonal and there existed an area of reduced shank diameter adjacent the head due to transfer of fiber from this area to the head during the manual shaping operation. The carbonized preform was CVI densified with carbon. The resulting carbon fiber reinforced/carbon matrix bolt exhibited a very well made shank. The head area was not well compacted. A necked down area of the shank remained adjacent the head. The threads were only roughly defined. This is believed due to the use of top large (T-300, 6K) a tow to permit better definition. The shank area (other than the necked down area) is believed eminently suitable for use as a shear pin.

The foregoing description and embodiments are intended to illustrate the invention without limiting it thereby. It will be understood that various modifications can be made from the preferred embodiments which have been described in detail. These variations are intended to be included within the present specification and claims. Examples of such variations are the following.

The methods described herein for the manufacture of externally or internally threaded composite fasteners may be employed to manufacture hollow tubular members. The matrices may be polymeric, carbon or ceramic. The fibers may be polymeric, carbon or ceramic. Combinations of different classes of materials may be employed in a single fastener or tubular member. For example, ceramic fibers such as Nextel TM alumina fibers available from Minnesota Mining and Manufacturing Company, Nicalon TM glassy silicon carbide fibers available from Dow Corning and Nippon Carbon Company of Japan may be used in place of or in combination with carbon fibers. Preforms may be infiltrated or impregnated with ceramic particulate bearing slurries or resins or with a ceramic precursor such as a sol gel. Suitable ceramic materials include, but are not limited to oxide ceramics such as alumina and the like, and non-oxide ceramics such as metal carbides, borides and nitrides and the like, and glassy ceramics. Because oxide ceramics react with carbon at elevated temperatures. A barrier layer is needed between the carbon fiber and the matrix. Silicon carbide is exemplary of a suitable barrier layer.

What is claimed is:

1. An externally threaded composite member comprising an elongate core formed from at least one of carbon and ceramic material, a fiber containing thread-defining element formed from at least one of carbon and ceramic fibers bonded by one of carbonaceous and ceramic material to the exterior surface of the core, said thread-defining element helically extending around and along the lengthwise direction of the core and projecting radially outwardly of the core, and a reinforcing fabric layer formed from at least one of carbon and ceramic fibers bound together by pyrolytic material securing said thread-defining element to the core.

2. The threaded member of claim 1, wherein the core is a carbon fiber reinforced carbon matrix rod of circular cross-sectional configuration.

3. The threaded member of claim 1, wherein the core comprises a plurality of substantially parallel continuous carbon fibers extending in the longitudinal direction of the core and bound to one another by a carbonaceous matrix.

4. The threaded member of claim 1, wherein the thread-defining element is an integral part of a tubular braided layer formed of at least one thread-defining element and a plurality of non-thread-defining elements, said thread-defining element having a greater radial projection relative to the core than the remainder of the non-thread-defining braiding elements.

5. The member of claim 4, wherein at least one of the core and tubular braid layer include continuous fibers selected from carbon and ceramic material.

6. The member of claim 5, wherein the pyrolytic material is selected from carbon, a metal carbide, boride and nitride, and a mixture of any of these.

7. The member of claim 4, wherein at least a portion of the non-thread-defining elements are flattened strips of fibrous material.

8. The threaded member of claim 1, wherein the core is hollow.

9. The threaded member of claim 1, wherein the thread-defining element comprises a D-shaped bundle of filaments.

10. The threaded member of claim 1, wherein the thread-defining element comprises one of a braided cord and a twisted cord.

11. The threaded member of claim 1, wherein the reinforcing fabric layer is stable against rotation under tension applied in the lengthwise direction of the core.

12. The threaded member of claim 1, wherein the thread-defining element is at a helix angle of between 50 and slightly less than 90 degrees.

13. The threaded member of claim 1, wherein the core includes one of carbon and ceramic fibers.

14. The threaded member of claim 1, wherein the core includes carbon fibers and a ceramic matrix.

15. The threaded member of claim 4, wherein the braided layer includes one of carbon and ceramic fibers.

16. The threaded member of claim 15, wherein the braided layer includes carbon fibers which are chemically treated to enhance resistance to oxidation.

17. The threaded member of claim 1, including fibers of differing chemical composition.

18. The threaded member of claim 1, wherein multiple helical thread-defining elements are present.

19. The threaded member of claim 1, wherein the thread-defining element is formed of twisted fibers of carbon.

20. The threaded member of claim 1, wherein the cross-sectional configuration of the core is polygonal having at least six sides.

21. The threaded member of claim 1, wherein the cross-sectional configuration of the core is oval.

22. The member of claim 1, wherein the thread is not machined or molded and has a rounded apex.

23. The member of claim 1, including carbon fibers and a carbon matrix at least one of which is chemically treated to enhance resistance to oxidation.

24. The member of claim 1, wherein the thread-defining element is formed of a tow of carbon fibers bonded by pyrolytic carbon to the core.

25. The externally threaded member of claim 1, comprising a thread-defining element helically extending around and along the lengthwise direction of the core and projecting radially outwardly of the core, and a reinforcing fabric layer enveloping conforming and secured to the outer surface of the combined core and threaded-defining element, the reinforcing fabric layer having the first portion of its fibers extending helically generally in the directional sense of the thread-defining element and the remaining portion of its fibers extending helically generally in a directional sense opposite to that of the thread-defining element.

26. The threaded member of claim 25, wherein the core includes carbon or ceramic fibers in a carbon or ceramic matrix rod of circular cross-sectional configuration.

27. The threaded member of claim 26, wherein the core comprises a plurality of substantially parallel continuous carbon or ceramic fibers extending in the longitudinal direction of the core bound to one another by a pyrolytic matrix.

28. The threaded member of claim 25, wherein the helical element contains one of fibrous carbon and ceramic reinforcement.

29. The threaded member of claim 28, wherein the helical element contains continuous fibrous reinforcement.

30. The threaded member of claim 25, wherein the helical element comprises a D-shaped bundle of fibers.

31. The threaded member of claim 25, wherein the helical element comprises one of a braided cord and twisted cord.

32. The threaded member of claim 25, wherein the helical element comprises short fibers extending in the direction of the helix embedded in one of carbon and ceramic matrices.

33. The threaded member of claim 25, wherein the reinforcing fabric layer comprises a tubular braided layer.

34. The threaded member of claim 25, wherein the reinforcing layer comprises one of a tubular knit and woven layer.

35. The threaded member of claim 25, wherein the core includes one of carbon and ceramic fibers chemically treated to enhance resistance to oxidation.

36. The threaded member of claim 25, wherein the reinforcing fabric layer includes one of carbon and ceramic fibers.

37. The threaded member of claim 25, wherein fibers of differing chemical composition are present.

* * * * *